US011888572B2

United States Patent
Bengtsson et al.

(10) Patent No.: US 11,888,572 B2
(45) Date of Patent: Jan. 30, 2024

(54) ARRANGEMENT FOR LOW LATENCY NETWORK ACCESS

(71) Applicant: Sony Group Corporation, Tokyo (JP)

(72) Inventors: Erik Bengtsson, Eslöv (SE); Fredrik Rusek, Eslöv (SE); Olof Zander, Södra Sandby (SE)

(73) Assignee: Sony Group Corporation, Tokyo (JP)

( * ) Notice: Subject to any disclaimer, the term of this patent is extended or adjusted under 35 U.S.C. 154(b) by 8 days.

(21) Appl. No.: 17/764,173

(22) PCT Filed: Jul. 7, 2020

(86) PCT No.: PCT/EP2020/069078
§ 371 (c)(1),
(2) Date: Mar. 26, 2022

(87) PCT Pub. No.: WO2021/069117
PCT Pub. Date: Apr. 15, 2021

(65) Prior Publication Data
US 2022/0376766 A1    Nov. 24, 2022

(30) Foreign Application Priority Data
Oct. 11, 2019   (SE) .................................... 1951158-3

(51) Int. Cl.
*H04B 7/06* (2006.01)
*H04W 24/08* (2009.01)
*H04W 56/00* (2009.01)

(52) U.S. Cl.
CPC .......... *H04B 7/0695* (2013.01); *H04W 24/08* (2013.01); *H04W 56/0015* (2013.01)

(58) Field of Classification Search
CPC . H04W 24/08; H04W 56/0015; H04W 24/02; H04L 5/0023; H04L 5/0048; H04B 7/0695
See application file for complete search history.

(56) References Cited

U.S. PATENT DOCUMENTS 10,666,342 B1 *   5/2020  Landis ................. H04B 17/318
2018/0070237 A1 * 3/2018  Cho .................... H04W 12/033
(Continued)

FOREIGN PATENT DOCUMENTS

WO     2018204340 A1    11/2018

OTHER PUBLICATIONS

International Search Report and Written Opinion from corresponding International Application No. PCT/EP2020/069078, dated Oct. 30, 2020, 17 pages.

*Primary Examiner* — Aristocratis Fotakis
(74) *Attorney, Agent, or Firm* — Tucker Ellis LLP

(57) ABSTRACT

An access node (120) of a wireless network (100), comprising a wireless transceiver (313) coupled to an antenna arrangement (314) for communication of radio signals in a plurality of beams; logic (310) configured to control the wireless transceiver to: transmit (505) a plurality of synchronization signals in a period (P) of a beam sweep, in which each of said synchronization signals identifies a beam-specific resource to be used when responding to the beam sweep; and monitor (560) omni-directionally dedicated resources allocated for reception of a low latency message (55) from a wireless terminal (10). The dedicated resources may be are allocated throughout said period, allowing for unscheduled transmission of the message to the access node.

15 Claims, 4 Drawing Sheets

(56) References Cited

U.S. PATENT DOCUMENTS

| | | | |
|---|---|---|---|
| 2018/0255532 A1* | 9/2018 | Li | H04L 1/00 |
| 2018/0337757 A1* | 11/2018 | Noh | H04L 27/26 |
| 2018/0359069 A1* | 12/2018 | Nam | H04B 17/345 |
| 2019/0327709 A1* | 10/2019 | Li | H04W 72/046 |
| 2020/0221363 A1* | 7/2020 | Lee | H04W 36/32 |
| 2020/0396749 A1* | 12/2020 | Zhou | H04B 7/0695 |
| 2020/0403738 A1* | 12/2020 | Zhou | H04B 7/088 |

* cited by examiner

ARRANGEMENT FOR LOW LATENCY NETWORK ACCESS

TECHNICAL FIELD

The present invention relates to the field of wireless communication, in particular to solutions for communication in a system where a wireless network includes access nodes providing communication capability in a plurality of controlled beams. Specifically, the invention relates to solutions for providing low latency network access for wireless terminals to convey a message to the network.

BACKGROUND

Increasing use of mobile voice and data communications may require a more efficient utilization of the available radio frequency resources. For increasing data transmission performance and reliability, the so-called multiple input and multiple output (MIMO) technology may be used in wireless radio telecommunication systems for transmitting information between the devices, for example between a base station, also referred to herein as an access node, and a user equipment (UE), also referred to herein as a wireless terminal. The wireless terminals may comprise mobile devices like mobile phones, mobile computers, tablet computers or wearable devices, and stationary devices like personal computers, smart meters, cash registers etc. In systems using MIMO technologies the devices may use multiple send and receive antennas. For example, the base station as well as the user equipment may each comprise multiple send and receive antennas. The MIMO technology forms the basis for coding techniques which use the temporal, spectral, as well as the spatial dimension for transmitting information. The enhanced coding provided in MIMO systems may increase the spectral and energy efficiency of the wireless communication.

In the $3^{rd}$ Generation Partnership Project (3GPP), standard specifications are outlined for wireless communication systems under the so-called 5G, including New Radio (NR). In such a system, an access node, referred to as a gNB, may have antenna arrangements including multiple antennas capable of communicating with wireless terminals within its cell. Using beamforming the access node may continuously calculate a suitable route for radio waves to reach each wireless terminal and may organize the antenna arrangement as a phased array to create beams of millimeter waves to reach the wireless terminals.

For an access node and a wireless terminal to be able to exchange data, they must be connected. In cellular systems, this is normally achieved by means of a random access control arrangement. This process may start with the wireless terminal monitoring synchronization signals transmitted from the access node, so as to obtain knowledge of in what resource, in time and frequency, to send a response signal.

In NR, such an initial access procedure involves wireless terminal listening to Synchronization Signal Block signals, SSB, transmitted by the gNB. Such SSBs are described in 3GPP TS 38.300 5.2.4. Synchronization signals are typically transmitted in a so-called beam sweep, wherein the SSBs are transmitted during 5 ms, after which there is no SSB for 15 ms. This is outlined in TS 38.213 section 4.1. The SSB transmission is repeated periodically. A UE that wants to access the network is supposed to respond at a certain resource, e.g. a Random Access Channel (RACH) resource that is paired to the beam of the swept SSB signal. This resource too, usable for responding to indicate a received synchronization signal, is sequentially allocated in time, which means that the wireless terminal may have to wait for its resource. The resource that it responds in indicates the preferred beam of the UE, i.e. an UL beam, which may be configured by a certain beamforming gain applied to an antenna of the gNB. This initial access process needs to take place whenever the wireless terminal is idle such as in RRC_idle state, inactive such as in RRC_inactive state and needs to perform a cell reselection, or in no RRC state.

A drawback associated with the implementation of periodic beam sweeping, involving transmission of synchronization signals for a plurality of beams, is that initial access may take some time. For certain low latency operations, triggered by the wireless terminal, problems associated with a lengthy access procedure may occur.

SUMMARY

It is thus an object of the present invention to overcome or minimize these and other problems. This is achieved by the combined features of the independent claims. The dependent claims define embodiments of the invention.

According to a first aspect, an access node of a wireless network is provided, comprising
  a wireless transceiver coupled to an antenna arrangement for communication of radio signals in a plurality of beams;
  logic configured to control the wireless transceiver to:
    transmit a plurality of synchronization signals in a period of a beam sweep, in which each of said synchronization signals identifies a beam-specific resource to be used when responding to the beam sweep; and
    monitor omni-directionally dedicated resources allocated for reception of a low latency message from a wireless terminal.

According to a second aspect, a wireless terminal is provided, comprising
  a wireless transceiver coupled to an antenna arrangement for communication of radio signals with a wireless network, which wireless network is configured to transmit a plurality of synchronization signals in a period of a beam sweep; and
  logic configured to control the wireless transceiver to:
    obtain information of omni-directionally dedicated resources of an access node of the wireless network, which dedicated resources are allocated for low latency access;
    transmit, to the access node, a first message in said dedicated resources.

According to further aspects, methods are provided for carrying out the steps indicated in the claims.

By means of the proposed solution, the dedicated resources, which may be allocated throughout said period, allow for unscheduled transmission of the message to the access node, without having to rely on beam sweep detection and control signaling.

Although various specific features are described in the following detailed description in connection with specific embodiments and aspects of the present invention, it should be understood that the features of the exemplary embodiments and aspects may be combined with each other unless specifically noted otherwise.

BRIEF DESCRIPTION OF THE DRAWINGS

The present invention will now be described in more detail with reference to the accompanying drawings.

DETAILED DESCRIPTION

Figure 1:
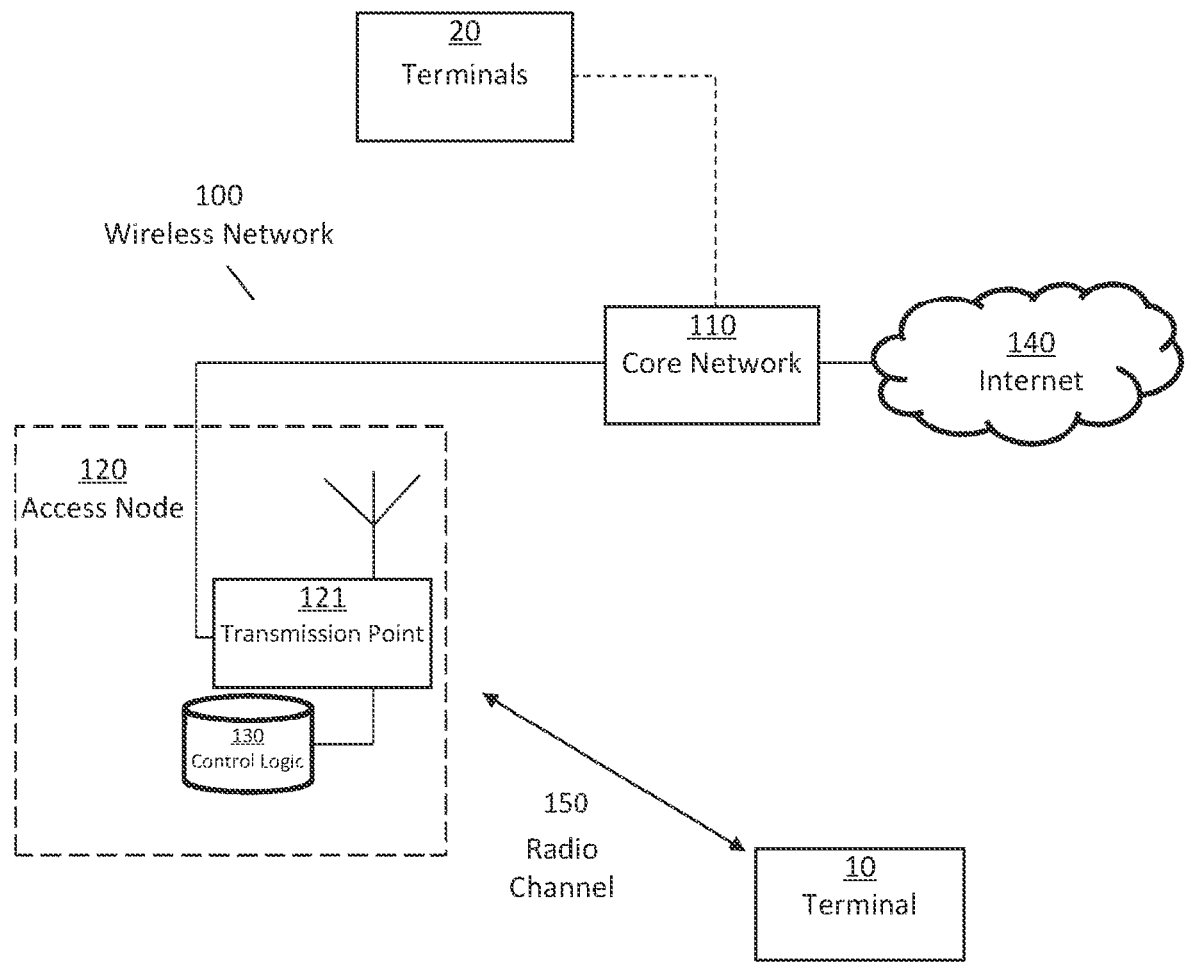
FIG. 1 schematically illustrates a wireless network according to an embodiment.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

In the following description, for purposes of explanation and not limitation, details are set forth herein related to various embodiments. However, it will be apparent to those skilled in the art that the present invention may be practiced in other embodiments that depart from these specific details. In some instances, detailed descriptions of well-known devices, circuits, and methods are omitted so as not to obscure the description of the present invention with unnecessary detail. The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented and are thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions. In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, various techniques for providing a wireless terminal the capability of low latency access to a wireless network configured for beam sweeping are described. These techniques may be set out in a wireless terminal and in an access node of the wireless network, and further involves methods employing signaling between the wireless terminal and the wireless network. In various embodiments, wireless transmission is carried out in a mm wave frequency band, e.g. over 6 GHz.

FIG. 1 schematically illustrates a scenario in a wireless communication system in which the presented solutions may be set out. A wireless network 100 may comprise a core network 110, which may be connected to other networks, e.g. through the Internet 140. The wireless network 100 further comprises one or more access nodes, commonly referred to as base stations, of which one access node 120 is illustrated. The access node 120 is configured for wireless communication 120 with various wireless terminals. The access node may comprise a transmission point (TRP) 121, comprising an antenna system, and control logic 130 configured to communicate with the core network 110. The control logic 130 may be arranged in conjunction with the TRP 121 and logic for controlling the antenna system of the TRP. Alternatively, the control logic 130 may be remotely arranged with respect to the TRP 121. Functionally, the TRP 121 and the control logic are nevertheless collectively referred to herein as the access node 120.

A first wireless terminal 10 is shown, also referred to as terminal for short herein, operative to communicate 150 wirelessly with the wireless network 100. The terminal 10 may be selected from the group comprising at least handheld device; mobile device; robotic device; smartphone; laptop; drone; tablet computer; wearable devices, IoT (Internet of Things) devices, smart meters, communication modems/access points, navigation devices (GPS units), cameras, CAM recorder etc.

Figure 2:
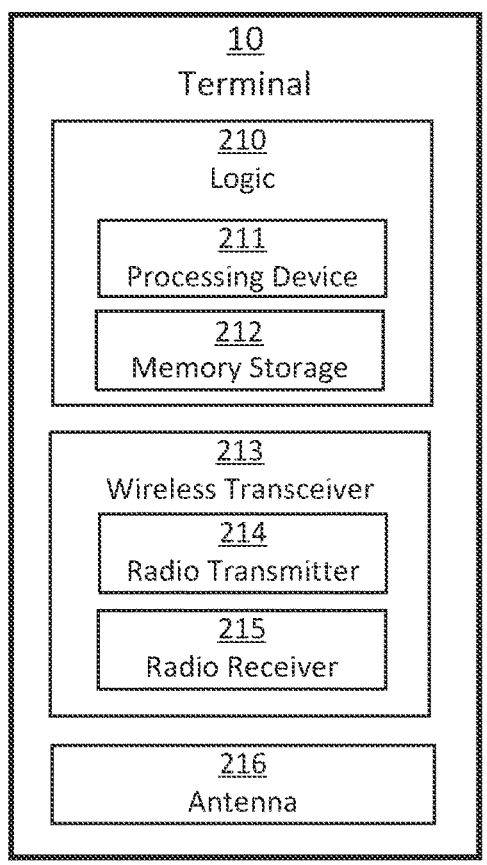
FIG. 2 schematically illustrates a wireless terminal configured to operate in accordance with the embodiments laid out herein.

FIG. 2 schematically illustrates a wireless terminal 10 for use in a wireless network 100 as presented herein, and for carrying out the method steps as outlined. The terminal 10 may comprise a wireless transceiver 213, such as a chipset, for communicating with other entities of the radio communication network 100, such as the access node 120. The wireless transceiver 213 may thus include a radio transmitter 214 and a radio receiver 215 for communicating through at least an air interface on a radio channel 150.

The terminal 10 further comprises logic 210 configured to communicate data and control signaling via the radio transceiver on the radio channel 120, to the wireless communication network 100 and possibly directly with other terminals 20 by Device-to Device (D2D) communication. In various embodiments, the logic 210 forms part of the transceiver 213.

The logic 210 may include a processing device 211, including one or multiple processors, microprocessors, data processors, co-processors, and/or some other type of component that interprets and/or executes instructions and/or data. Processing device 211 may be implemented as hardware (e.g., a microprocessor, etc.) or a combination of hardware and software (e.g., a system-on-chip (SoC), an application-specific integrated circuit (ASIC), etc.). The processing device 211 may be configured to perform one or multiple operations based on an operating system and/or various applications or programs.

The logic 210 may further include memory storage 212, which may include one or multiple memories and/or one or multiple other types of storage mediums. For example, memory storage 212 may include a random access memory (RAM), a dynamic random access memory (DRAM), a cache, a read only memory (ROM), a programmable read only memory (PROM), flash memory, and/or some other type of memory. Memory storage 212 may include a hard disk (e.g., a magnetic disk, an optical disk, a magneto-optic disk, a solid state disk, etc.).

The memory storage 212 is configured for holding computer program code, which may be executed by the processing device 211, wherein the logic 210 is configured to control the terminal 10 to carry out any of the method steps as provided herein. Software defined by said computer program code may include an application or a program that provides a function and/or a process. The software may include device firmware, an operating system (OS), or a variety of applications that may execute in the logic 210.

The terminal 10 may further comprise an antenna 216, such as an antenna array 216. The logic 210 may further be configured to control the radio transceiver to employ an anisotropic sensitivity profile of the antenna array 216 to transmit radio signals in a particular transmit direction. The terminal 10 may further comprise other elements or features than those shown in the drawing or described herein, such as a positioning unit, a power supply, a casing, a user interface etc.

Figure 3:
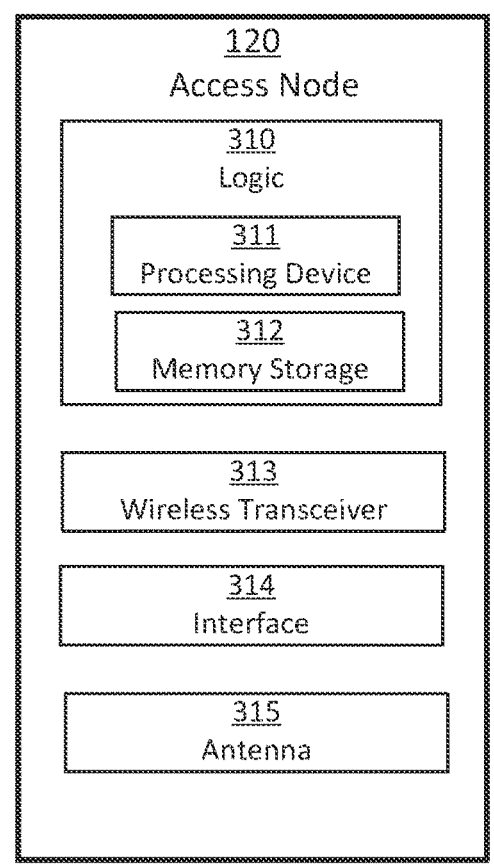
FIG. 3 schematically illustrates an access node configured to operate in accordance with the embodiments laid out herein.

FIG. 3 schematically illustrates an access node 120 of the wireless network 100, adapted to wirelessly communicate with wireless terminals such as the terminal 10, and configured for carrying out the associated method steps as outlined. This embodiment is consistent with the scenario of FIG. 1.

The access node 120 may comprise a wireless transceiver 313 for communicating with other entities of the wireless network 100, such as the terminal 10, through at least an air interface on a radio channel 150. The access node 120 may further comprise an interface 314 for communicating with the core network 110.

The access node 120 further comprises logic 310 configured to control at least the wireless transceiver 313 to communicate data on the radio channel 150 to terminals including terminal 10.

The logic 310 may include a processing device 311, including one or multiple processors, microprocessors, data processors, co-processors, and/or some other type of component that interprets and/or executes instructions and/or data. Processing device 311 may be implemented as hardware (e.g., a microprocessor, etc.) or a combination of hardware and software (e.g., a system-on-chip (SoC), an application-specific integrated circuit (ASIC), etc.). The processing device 311 may be configured to perform one or multiple operations based on an operating system and/or various applications or programs.

The logic 310 may further include memory storage 312, which may include one or multiple memories and/or one or multiple other types of storage mediums. For example, memory storage 312 may include a random access memory (RAM), a dynamic random access memory (DRAM), a cache, a read only memory (ROM), a programmable read only memory (PROM), flash memory, and/or some other type of memory. Memory storage 312 may include a hard disk (e.g., a magnetic disk, an optical disk, a magneto-optic disk, a solid state disk, etc.).

The memory storage 312 is configured for holding computer program code, which may be executed by the processing device 311, wherein the logic 310 is configured to control the access node 120 to carry out any of the method steps as provided herein. Software defined by said computer program code may include an application or a program that provides a function and/or a process. The software may include device firmware, an operating system (OS), or a variety of applications that may execute in the logic 310.

The access node 120 may further comprise or be connected to an antenna 315, such as an antenna array 315. The logic 310 may further be configured to control the wireless transceiver 313 to employ an anisotropic sensitivity profile of the antenna array 315 to transmit radio signals in a particular transmit direction.

In various embodiments, the wireless terminal 10 and the access node 120 are configured to operate at a mm wave Frequency Range (FR), such as FR2 as provided for in NR. The logic 310 is configured to control the wireless transceiver 313 to transmit a plurality of synchronization signals in a beam sweep, in which each of said synchronization signals identifies a beam-specific resource usable for wireless terminals when responding to the beam sweep, for entering a connected state.

Figure 4A:
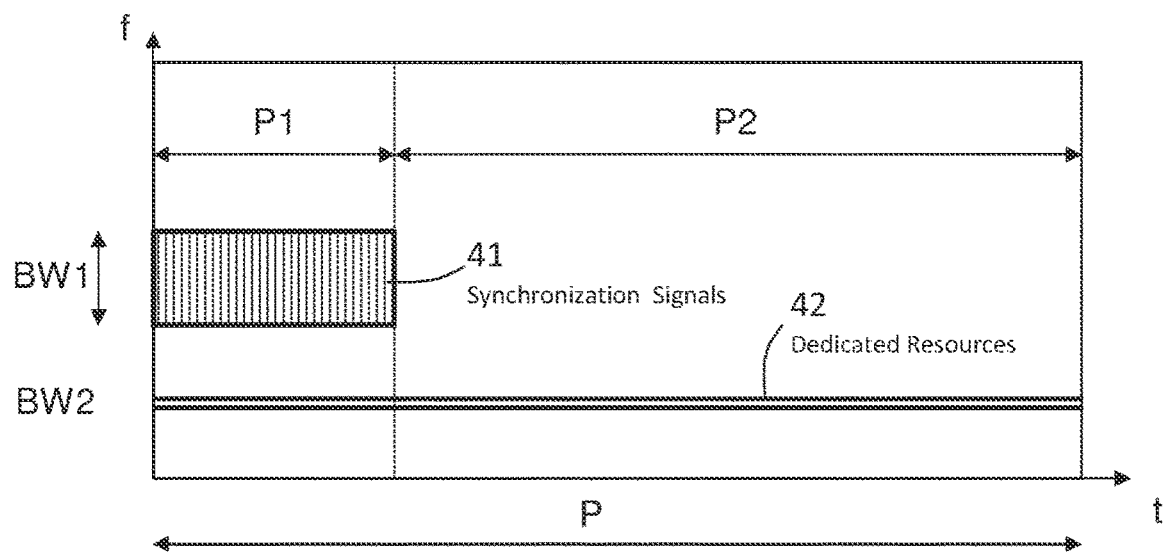
FIGS. 4A-4C schematically illustrate diagrams of resources in time and frequency according to different embodiments, usable for transmission of synchronization signals in a beam sweep period from an access node as well as a separate low latency resource for reception of message from wireless terminal in accordance with various embodiments laid out herein.

FIG. 4A schematically illustrates a diagram of resources in time t and frequency f, in accordance with various embodiments. The drawing shows one period P of a periodic beam sweep, as carried out by the access node 120. This includes a first part P1 during which a plurality of synchronization signals 41 are transmitted from the access node. These may be conveyed in resources at certain bands or frequencies, or within a certain bandwidth, herein denoted BW1. In a second part P2 of the period P, the synchronization signals of the beam sweep are not transmitted. It should be understood that in alternative embodiments, the first part P1 may be located after the second part P2, or indeed split the second part P2 in different sub parts. In either case, the transmission of synchronization signals 41 is confined to said first part P1. In some embodiments, the synchronization signals 41 may be a Synchronization Signal Block (SSB) of a 3GPP wireless system, such as NR.

As noted, when a wireless terminal 10 is to connect to the wireless network 100, it will listen for the synchronization signals 41 of the SSB. For time-critical operations, where instant access to the wireless network 100 is desired, herein referred to as a context of low latency, a number of problems with the present initial access procedure of NR may be identified.

First of all, during P1, lasting e.g. 5 ms, of SSB signaling 41, there is no guarantee that the access node 120, e.g. a gNB, transmits a beam that the wireless terminal 10 can detect. It is up to implementation which beams that should be transmitted during SSB signaling 41, and the following situations may occur, a) The access node 120 may use broad beams, but the wireless terminal beams may be physically blocked or deeply faded so that such broad beam has too low signal strength to be received at the wireless terminal 10;

b) The access node 120 may use narrow beams, but in that case not all directions can be accommodated within P1, which means that it may take several periods P, each of e.g. 20 ms, before a satisfactory beam for the wireless terminal 10 is transmitted by the access node 120.

Secondly, due to the sparsity of the SSB signaling 41, even the best possible implementations (access node 120 and wireless terminal 10) would have a mean time before receiving an SSB 41 of 10 ms for a 5+15 ms period P, while the worst case is 20 ms. For some applications this may be too much.

Finally, when the wireless terminal 10 responds to a received beam, there may be a collision since another wireless terminal may very well also respond in the same resource. In that case, the wireless terminal must try again in the next period, which increases the latency.

Time critical operations which may have tight constraints on latency may include mission critical applications, such as power plants, emergency stops of mechanical/chemical processes, vehicle control systems etc. One heavily contributing source of latency may in various cases be initial access. As a consequence, wireless terminals 10 with a need for low latencies need to be always connected to the network 100 (RRC_connected), when the latency associated with establishing connection is the bottleneck. Thus, there exists an objective to reduce latency for non-connected wireless terminals 10, such as wireless devices in RRC_idle, RRC_inactive but with a need to change cell, or unconnected and just powered on.

For this purpose, and according to a first aspect, an access node 120 of a wireless network 100 is hereby provided, configured to overcome these drawbacks. The access node 120 comprises a wireless transceiver 313 coupled to an antenna arrangement 314 for communication of radio signals in a plurality of beams. Moreover, the access node 120 comprises logic 310 configured to control the wireless transceiver to transmit a plurality of synchronization signals 41 in a period of a periodic beam sweep, in which each of said synchronization signals identifies a beam-specific resource. As is schematically illustrated in the drawing, the synchronization signals 41 may be successively transmitted throughout the period P. In various embodiments, each of those beam-specific resources may be used by a wireless terminal for responding to the beam sweep, so as to obtain initial access. Furthermore, the logic 310 is configured to control the wireless transceiver to omni-directionally monitor dedicated resources 42 allocated for reception of a low latency message from a wireless terminal.

According to a second aspect, a wireless terminal 10 is provided, comprising a wireless transceiver 213 coupled to an antenna arrangement 216 for communication of radio signals with a wireless network 100, which wireless network is configured to transmit a plurality of synchronization signals 50 in a beam sweep; and logic 210 configured to control the wireless transceiver to:

obtain information 54 of omni-directionally dedicated resources of an access node 120 of the wireless network, which dedicated resources are allocated for low latency access; and transmit, to the access node, a first message in said dedicated resources.

By means of these solutions, dedicated resources are provided for wireless terminals to obtain instant access to the wireless network 100, or at least to transmit a message, without having to rely on the sparsity and periodicity of the synchronization signals transmitted in successive beam sweep resources 41.

Figure 4B:
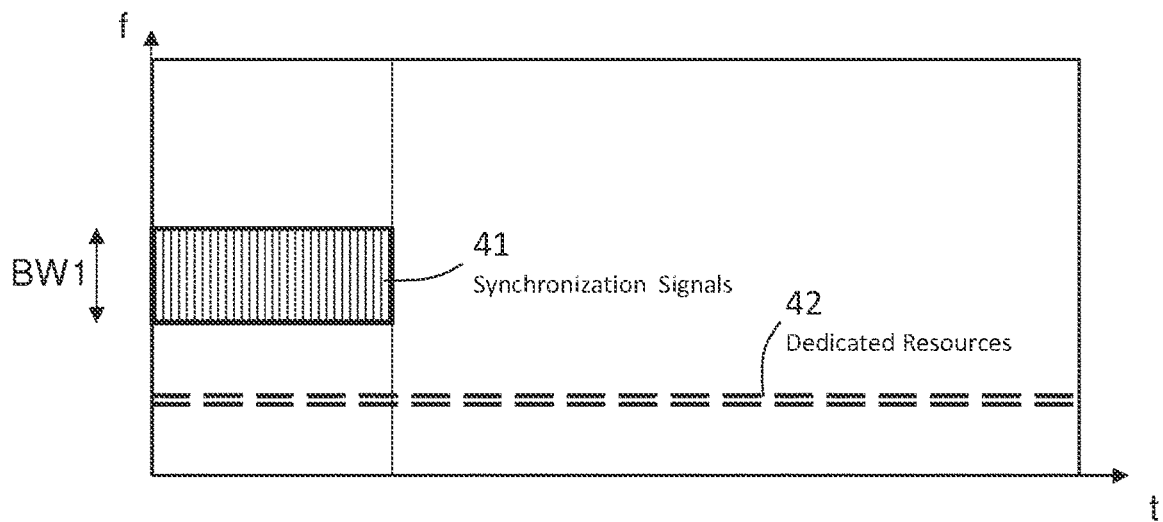

FIG. 4B illustrates a variant of the embodiment of FIG. 4A. In this alternative embodiment, the dedicated resources 42 may be intermittently monitored throughout the beam sweep period P, such that a spacing in time between two consecutive dedicated resources define an upper limit for a waiting time for the wireless terminal 10 to be able to access. In such embodiments, the dedicated resources 42 are defined by at least time and frequency or bandwidth BW2.

Figure 4C:
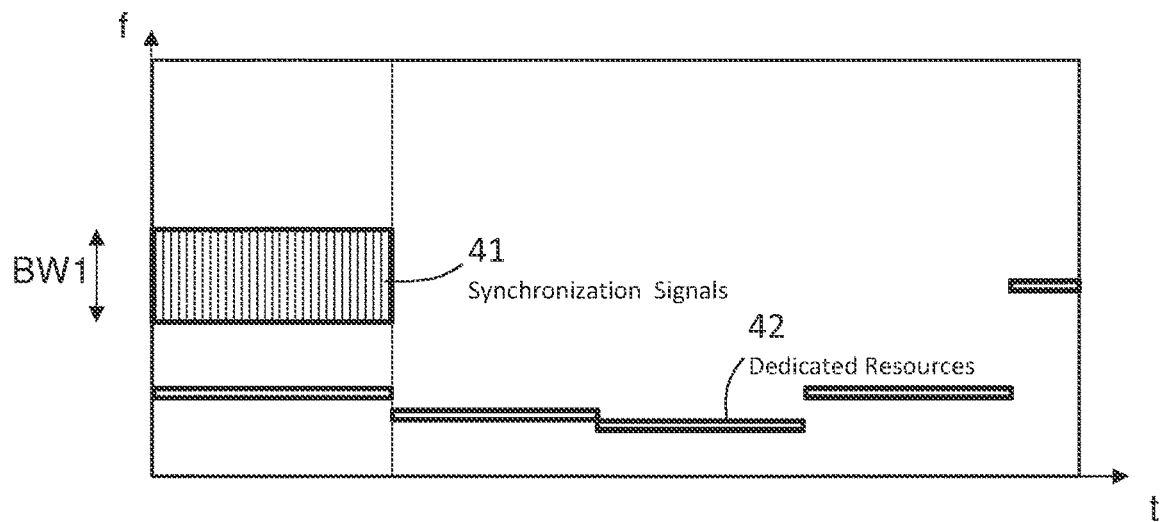

FIG. 4C illustrates yet another variant of the embodiment of FIG. 4A. In this alternative embodiment, the dedicated resources 42 may be monitored throughout the beam sweep period P, but at different frequencies at different portions of the period P, which may be determined by the access node 120 or by specification. In such embodiments, the dedicated resources 42 are defined by at least time and frequency.

In various embodiments, said dedicated resources 42 are thus allocated throughout said period P and are monitored continuously in time in the access node 120. In such embodiments, the dedicated resources 42 are defined by frequency or bandwidth BW2.

In some embodiments, the beam sweep has an associated period P including a first part P1 and a second part P2, wherein the synchronization signals are successively transmitted in said first part, and wherein the dedicated resources are allocated in at least one of said first P1 and second P2 part of said period.

In some embodiments, as in FIGS. 4A and 4C, the dedicated resources 42 are continuously allocated in said period P, such as throughout the entire period P or only in a part P1 or P2 of the period P. In alternative embodiments, as in FIG. 4B, said dedicated resources 42 are instead intermittently allocated in said period P, either throughout said period P or in a part P1 or P2 of the period P.

In the described embodiments, low latency access is provided by means of the dedicated resources 42. Moreover, access is provided independent of the beam sweep, in various embodiments.

In various embodiments, the access node 120 operates a mm wave wireless communication system, such as a an FR2 (Frequency Range) system operated at, e.g. 28 GHz or higher. The system provides basis for the access node 120 to allocate the dedicated resources 42 usable for high reliability low latency communications, in which the access node 120 receives omni-directionally. These resources 42 may be used for receiving a low latency message from a wireless terminal initial access by wireless terminals 10 requiring low latency connection. The dedicated resources 42 are in various embodiments may be continuous in time. Hence, a certain (narrow) band BW2 must be used for this purpose. Since the access node 120 receives omni-directionally, i.e. without beamforming gain, the received SNR is low. Therefore, only short messages, e.g. low-order modulation and/or low code rates, can be transmitted over this band BW2. In this context, with low SNR, a "short message" should be interpreted as low spectral efficiency, e.g., <<1, so that the transmitted data is relatively small in comparison to the transmission time-bandwidth product. In various embodiments, the band BW2 of the dedicated resources 42 may be a single subcarrier, e.g. in the range of 30-120 kHz. With spectral efficiency (Rate/B)<<1, a data transmission capability may be 3-12 kb/s for a message received in the dedicated resources 42. In some embodiments, the message is in itself sufficient to obtain required low latency connection, where e.g. only a short message needs to be transmitted in the UL. In alternative embodiments, the message is used as a trigger to obtain faster allocation of further resources for UL and/or DL connection, than the beam sweep can guarantee.

Various embodiments may be implemented as follows, in which the feature of the access node 120, such as a gNB, to receive a message in the omni-directionally allocated resources 42 during the beam sweep period is denoted High Reliability Low Latency Connection (HRLLC). During initial access to a certain cell, the access node 120 should signal to the wireless terminal 10 whether or not it supports HRLLC, and if so, in which bandwidth BW2 the HRLLC resources 42 are located. There are several possibilities here, of which some examples are outlined below:

The HRLLC resources 42 may be restricted to a certain group of wireless terminals. In this case, the indication from the access node 120 about its support of HRLLC needs only to be signaled in case the wireless terminal 10 belongs to this group. Later, during a connection via the HRLLC resources 42, the connection message should include an ID, flag or other capability indicator that indicates to the access node 120 that the wireless terminal 10 belongs to the restricted group to which HRLLC is available, so that the access node 120 may selectively accept messages on the dedicated resources 42 for such wireless terminals only.

Under the same assumption as above, i.e., that the HRLLC resources 42 may be restricted to a certain group of wireless terminals, another implementation is that the wireless terminal 10 requests, and obtains, information from the access node 120 whether HRLLC is supported.

Some access nodes 120 may have HRLLC available for all wireless terminals. In that case, this capability should be signaled to all wireless terminals during initial access. Alternatively, a wireless terminal 10 may request, and obtain, information whether or not HRLLC is available and free.

A wireless terminal 10 is thus made aware of the availability of HRLLC resources 42 at an access node 120, e.g. by any of the ways just described. Next time the wireless terminal 10 wants to access the network using the cell controlled by the access node 120, the wireless terminal 10 can transmit a signal, such as e.g. RACH preamble, forming a message, in said allocated resources 42 of that band BW2. In various embodiments, the message may be determined by means of the signal shape. As these resources 42 are omni-directional and preferably continuous in time they are always available for use by the wireless device, in the sense that these resources 42 are not allocated in a predetermined and scarce time slot as the synchronization signals 41. The wireless terminal 10 may thus access the node without delay, as opposed to having to detect at least one of a plurality of successively transmitted synchronization signals 41 and furthermore having to reply in the uplink in a certain channel associated with that detected synchronization signal. The access node 120 can thereafter take actions according to the specific situation (more about this below).

Whenever HRLLC is available, and the wireless terminal 10 is authorized to use it, it is always beneficial for the wireless terminal 10 to use it. Therefore, there is no technical criteria that must be met before using HRLLC resources 42; this is essentially a business aspect.

Figure 5:
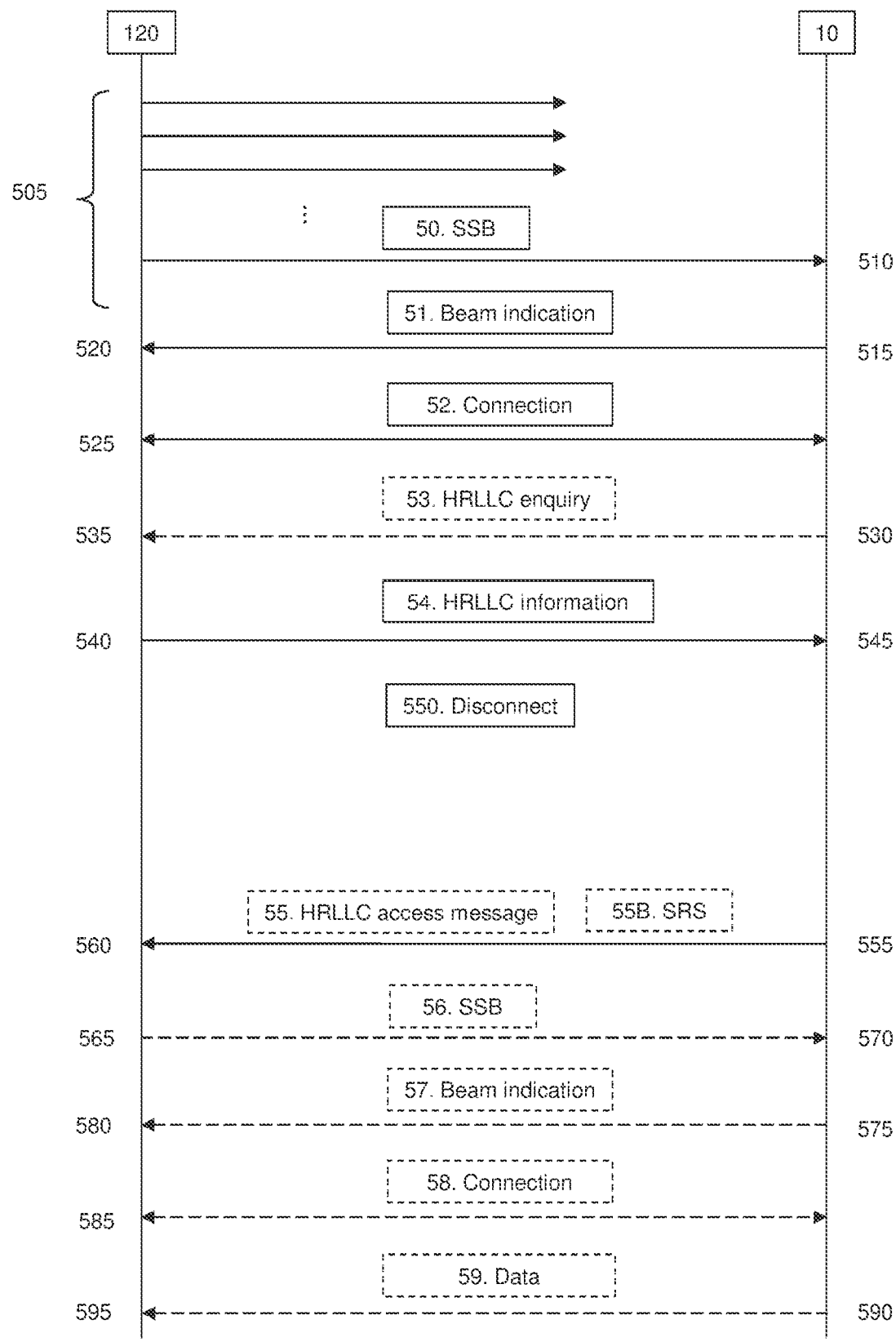
FIG. 5 schematically illustrates a signal diagram including steps carried out between an access node and a wireless terminal in accordance with various embodiments.

FIG. 5 shows a schematic representation of a signaling diagram covering various embodiments present above. The involved signaling is in some embodiments a part of the initial access procedure of a wireless communication system where the wireless terminal 10 accesses the wireless network 100 through the access node 120, such as a gNB arranged to communicate at a mm wave frequency band BW1. Up to step 535, the signaling may be legacy behavior.

In 505 the access node 120 periodically carries out a beam sweep, by successive transmission of synchronization signals.

At 510, the wireless terminal 10 listens to the beam sweep and finds a "suitable beam" by detecting at least one synchronization signal 50, such as an SSB, transmitted in the beam sweep.

At 515 the wireless terminal 10 transmits an indication 51 of the detected beam, which is received 520 by the access node 120 in a beam-specific resource allocated to be used when responding to the beam sweep, e.g. by selecting a corresponding RACH resource.

At 525 further signaling may be employed for exchange of control information 52 in an initial access procedure to set up a data connection between the access node 120 and the wireless terminal 10. The wireless terminal 10 may thereby be configured in RRC_connected state.

At 545 the wireless terminal 10 obtains information 54 related to the allocated resources 42 dedicated for low latency connection, such as HRLCC. The information 54 may thus identify omni-directionally dedicated resources 42 of the access node 120, which are allocated and monitored for message reception within the period P of the periodic beam sweep.

In some embodiments, this obtainment by be provided by means of detecting the information 54 from a signal transmission 540 by the access node 120, or by another access node of the access network, which is transmitted 540 by broadcast, multicast or unicast. The information 54 may thus be obtained by detecting a transmission made to all wireless terminals within the cell, and without being requested, or directly addressed to the wireless terminal 10.

In a variant of this embodiment, obtainment of the information 54 related to the allocated resources 42 dedicated for low latency connection may involve transmitting 530, from the wireless terminal 10, an enquiry message 53 for receipt 535 in the access node 120. In a scenario where not all wireless terminals have access to the allocated resources 42, such an embodiment may include the access node 120 determining whether the requesting wireless terminal 10 is eligible to make use of the allocated resources 42, e.g. by making cross-reference in a database using an ID of the wireless terminal 10 or other indication provided in the enquiry message 53. The access node 120 may be configured to transmit 540 the information identifying the dedicated resources 42 responsive to the enquiry message 53. This embodiment, involving transmission 530 of a request 53 message and receiving the information 54 in response thereto, may be carried out at any stage of communication between the wireless terminal 10 and the access node 120.

At 550 the wireless terminal 10 may subsequently disconnect from the network 100, and e.g. go to an idle or inactive mode, or even be switched off.

At a subsequent step, the wireless terminal 10 may be triggered to connect, or at least send a message, to the access node 120 with low latency. For certain purposes, the potential to transmit a message in the resources 42 allocated for omni-directional reception in the access node 120 may conveniently be used, rather than going through the process of steps 505-525 by detecting a beam and responding in a resource associated with that beam. In such a scenario, the wireless terminal 10 is thereby configured to transmit 555 a message 55 for receipt in the access node 120, without having to accommodate to when a beam may be 510 detected and when the associated resource connected to that beam is allocated. Standardized procedures for access as specified in e.g. 3GPP TS38.331 may be avoided. In an embodiment when the resources 42 for omni-directional reception in the access node 120 are continuously allocated throughout the entire beam-sweeping period P, or at least an entire part P1 or P2 of the period P, substantially instant reception of the message 55 in the access node 120 may be obtained.

Various embodiments of use cases may be conceived in which the proposed solution may conveniently applied.

One is mission-critical applications, e.g. industrial applications. A wireless terminal 10 that needs to instantly trigger some event, e.g. in a receiving device 20 connected to the wireless network 100, can signal this information in said omni-directional resources 42, thus completely avoiding the initial access stage. This may e.g. relate to a scenario where a machine or a process needs to be halted as instantaneously as possible at or by the receiving device 20. Due to the omni-directionality of how these resources 42 are allocated and monitored by the access node 120, such message may need to be very short, and trigger the wireless network 100 to issue a control signal to the receiving device 20.

In case a larger data volume needs to be signaled in the UL, the wireless terminal 10 may send a request 55 in the HRLLC resources 42 for an instant beam sweep. The access node 120 may then be configured to halt its current beam-sweeping operations and proceed with an instant beam sweep towards the wireless terminal 10 so that a high-quality link can be setup, in which a longer data message can be transmitted. This may involve the following steps.

The message 55 transmitted 555 identifies a request for an instant beam sweep.

The access node initiates a new beam sweep, including transmission 565 of synchronization signals 56, responsive to receiving 560 the request 55 in the omni-directionally allocated resources 42. This way, at least latency caused by the idle period part P2 may be saved. In one embodiment, the request message 55 may furthermore trigger the access node 120 make the subsequent transmission 565 to include a denser set of synchronization signals, than in predetermined transmission 505. In various embodiments, the UL request message 55 may include one or more wide beam pilot signals, e.g. Sounding Reference Signals (SRS). The access node 120 may be configured to identify a precoder, e.g. a beam from a codebook, based on the received pilot signals. Thereby the access node 120 may obtain information on the direction towards the wireless terminal 10 and may be configured to control the antenna array 315 to transmit synchronization signals 56, e.g. SSBs, towards the wireless terminal. The wireless terminal 10 may be configured to use the synchronization signals 56 to identify a best narrow receive beam and, based on beam reciprocity, potentially also a UE transmit beam.

Upon reception 570 in the wireless terminal of a synchronization signal 56, the wireless terminal 10 is configured to transmit 575 an indication of the detected beam, for reception 580 in the access node.

At 580 control information 58 is exchanged to establish connection, and subsequently the wireless terminal 10 may transmit 590 (and receive) further data 59 in the UL.

Another embodiment of a use case may involve a stationary wireless terminal 10, meaning that the wireless terminal 10 communicates with the access node 120 from a predetermined position. In such scenarios, the wireless terminal 10 may already be aware of its UL beam direction, e.g. from a previous connection 525, usable for communicating with the access node 120. This can be used to build a protocol so that various steps of the initial access procedure can be avoided.

Referring again to FIG. 5, the wireless terminal 10 signals 555 in the HRLLC resources 42 that it would like to connect, the signaling forming an access message 55. The wireless terminal 10 may also signal, by means of the access message 55, that no beam sweep is required, since the wireless terminal 10 is aware of its UL beam. Then the access node 120 may proceed to connect with the wireless terminal 10 without any beam sweep. Rather, the wireless terminal 10 may be configured to transmit 555 a sounding signal 55B, such as a Sounding Reference Signal (SRS) signal, either in the dedicated resources 42 of BW2, or elsewhere within BW1. The access node 120 receives 560 the SRS, and then computes the DL beam after which a connection 585 is established without the initial access stage of beam sweeping. This way, if more data 59 than may be conveyed through the omni-directional dedicated resources 42 are to be transmitted by the wireless terminal, connection for data transmission may still be obtained faster than what can be provided through legacy processes, by using the omni-directional dedicated resources 42.

Various embodiments of the proposed solution have been outlined herein, by means of which latency problems associated with initial access to an access node 120 configured for beam sweeping can be avoided. In order for the proposed solution to work well, collisions on the channel configured by the omni-directional resources 42 should be avoided. For these reasons, an operator of the wireless network may provide a limited set of wireless terminals authorization to make use of those resources, and possibly at different times.

The invention claimed is:

1. An access node of a wireless network, comprising:
 a wireless transceiver coupled to an antenna arrangement for communication of radio signals in a plurality of beams;
 logic configured to control the wireless transceiver to:
  transmit a plurality of synchronization signals in a period of a beam sweep, in which each of said synchronization signals identifies a beam-specific resource to be used when responding to the beam sweep; and
  monitor dedicated resources allocated for omni-directional reception of a low latency message from a wireless terminal,
 wherein said dedicated resources are continuously allocated in said period.

2. The access node of claim 1, wherein said period includes a first part and a second part, wherein the synchronization signals are successively transmitted in said first part, and wherein the dedicated resources are allocated in said first and second part of said period.

3. The access node of claim 1, wherein the logic is configured to control the wireless transceiver to
 transmit, to the wireless terminal, information identifying said dedicated resources.

4. The access node of claim 3, wherein the logic is configured to control the wireless transceiver to
 receive a request from the wireless terminal to identify support of low latency initial access, wherein the transmission of the information identifying said dedicated resources is carried out responsive to said request.

5. The access node of claim 1, wherein the logic is configured to
 control the wireless transceiver to receive a first message from the wireless terminal in said dedicated resources.

6. The access node of claim 5, wherein the logic is configured to issue a control signal to a receiving device connected to the wireless network, responsive to receiving the first message.

7. The access node of claim 5, wherein the logic is configured to control the wireless transceiver to commence a new beam sweep responsive to receiving the first message.

8. The access node of claim 5, wherein said first message identifies an access request from the wireless terminal.

9. The access node of claim 8, wherein said first message identifies awareness, in the wireless terminal, of an uplink beam usable for communicating with the access node.

10. The access node of claim 9, wherein is the logic is configured to control the wireless transceiver to
    detect reception of a reference signal from the wireless terminal;
    determine a downlink beam based on the received reference signal.

11. The access node of claim 10, wherein said reference signal is received in said dedicated resources.

12. The access node of claim 9, wherein the logic is configured to
    control the wireless transceiver to receive a second message from the wireless terminal in said uplink beam.

13. A wireless terminal, comprising:
    a wireless transceiver coupled to an antenna arrangement for communication of radio signals with a wireless network, which wireless network is configured to transmit a plurality of synchronization signals in a period of a beam sweep; and
    logic configured to control the wireless transceiver to:
        obtain information of dedicated resources of an access node of the wireless network, which dedicated resources are allocated for omni-directional low latency access and are continuously allocated in said period; and
        transmit, to the access node, a first message in said dedicated resources.

14. The wireless terminal of claim 13, wherein first message is transmitted at an unscheduled point in time.

15. An access node of a wireless network, comprising:
    a wireless transceiver coupled to an antenna arrangement for communication of radio signals in a plurality of beams;
    logic configured to control the wireless transceiver to:
        transmit a plurality of synchronization signals in a period of a beam sweep, in which each of said synchronization signals identifies a beam-specific resource to be used when responding to the beam sweep;
        monitor dedicated resources allocated for omni-directional reception of a low latency message from a wireless terminal;
        control the wireless transceiver to receive a first message from the wireless terminal in said dedicated resources; and
        commence a new beam sweep responsive to receiving the first message.

* * * * *